United States Patent

[11] 3,610,703

[72] Inventors Michael Slavin;
 Ralph W. Carp, both of Baltimore, Md.
[21] Appl. No. 867,839
[22] Filed Oct. 20, 1969
[23] Division of Ser. No. 712,672, Mar. 13, 1968, Pat. No. 3,494,671
[45] Patented Oct. 5, 1971
[73] Assignee The Bendix Corporation

[54] MEANS FOR DELAYING EFFECTIVE CONTROL OF VEHICLE BRAKING BY AN ADAPTIVE BRAKING SYSTEM UNTIL CERTAIN WHEEL VELOCITY CONDITIONS HAVE BEEN SATISFIED
13 Claims, 9 Drawing Figs.

[52] U.S. Cl. ........................................ 303/21 P, 188/181 C, 303/20
[51] Int. Cl. ........................................ B60t 8/04
[50] Field of Search ........................................ 188/181 A, 181 C, 181 I; 235/150.2; 246/182; 303/21 A, 21 AF, 21 B, 21 BE, 21 BB, 21 C, 21 CE, 21 CF, 21 CG, 21 F

[56] References Cited
UNITED STATES PATENTS
3,450,444 6/1969 Ballard .................. 188/181 C X
3,467,443 9/1969 Okamoto et al. ............. 303/21 BB
3,507,544 4/1970 Wakamatsu et al. ....... 303/21 CG OTHER REFERENCES
Millman & Taub, Pulse, Digital, and Switching Waveforms, 1965, McGraw-Hill Book Company, pp. 658– 663

Primary Examiner—Milton Buchler
Assistant Examiner—Stephen G. Kunin
Attorneys—Plante, Arens, Hartz, Smith and Thompson, Bruce L. Lamb and William G. Christoforo ABSTRACT: Means for delaying effective control of vehicle braking by the control channel of an adaptive braking system includes a memory which is activated when a controlling vehicle wheel after being manually braked attains a certain deceleration. At that time a first signal proportional to a percentage of instantaneous wheel speed is memorized and thereafter continually compared to a second signal proportional to actual wheel speed. If within a predetermined time period the second signal drops to the level of the first signal an output is generated which latches open a gate to allow the control channel error signal to proceed to a brake pressure modulator to thereby control vehicle braking.

FIG. 1.

INVENTORS
RALPH W. CARP
MICHAEL SLAVIN

BY William G. Christoforo
ATTORNEY

INVENTORS
RALPH W. CARP
MICHAEL SLAVIN

FIG. 6A.

RALPH W. CARP
MICHAEL SLAVIN
INVENTORS

BY William G. Christoforo
ATTORNEY

INVENTORS
**RALPH W. CARP
MICHAEL SLAVIN**

BY *William G. Christoforo*
ATTORNEY

3,610,703

MEANS FOR DELAYING EFFECTIVE CONTROL OF VEHICLE BRAKING BY AN ADAPTIVE BRAKING SYSTEM UNTIL CERTAIN WHEEL VELOCITY CONDITIONS HAVE BEEN SATISFIED

Cross-References to Related Applications

This is a division of application Ser. No. 712,672 filed Mar. 13, 1968, now Pat. No. 3,494,671.

BACKGROUND OF THE INVENTION

The wheel braking pressure which can be exerted by a motor vehicle operator is sufficient to cause the wheels to lock with resultant increase in stopping distance and reduced lateral vehicle stability. This is especially true when driving on low frictional coefficient surfaces. However, it is possible to optimize braking characteristics of a wheeled vehicle under any tire-road interface condition by providing the vehicle with an adaptive braking system which will modulate the braking pressure to a pressure which maximizes the frictional force at the tire-road interface.

Mu-slip curves, which are plots of the tire-road interface frictional force versus wheel slip, are well known in the art. These curves, which are empirically obtained show a maximum mu in the range of 15 to 25 percent slip. Height and sharpness of this maximum mu point is generally dependent upon the nature of the tire-road interface and its condition. An antiskid system which permits only that amount of brake pressure to be applied which causes a wheel slip corresponding to the maximum mu point of a mu slip curve for the conditions then encountered provides optimum braking to the vehicle being controlled.

Adaptive braking systems are known which initiate automatic braking control of the vehicle wheels whenever a controlled wheel attains a predetermined level of wheel deceleration while the vehicle is being manually braked. It is possible in the use of these earlier systems that a braked control wheel may strike an imperfection in the road surface momentarily imparting a high level of wheel deceleration to the wheel, thus causing the automatic adaptive braking system to trigger even though optimum braking characteristics would have been obtained in that case through continued manual control of the braking system. Certain other adaptive braking systems have mitigated this problem by providing a means in the from of an integrating circuit for delaying automatic braking control until the control wheel has attained the predetermined deceleration level and thereafter the integral of deceleration with respect to real time becomes equal to a predetermined constant. It should be noted that using the integrating delay the same absolute change of vehicle wheel speed is required to initiate automatic control regardless of the actual wheel speed.

SUMMARY OF THE INVENTION

It is known that a wheel traveling at a high rate of rotational speed is able to attain high levels of deceleration before a skid becomes imminent, whereas a wheel travelling at lower rates of rotational speed will begin to skid at lower levels of deceleration. An automatic braking system which does not take this into account, such as the system having the integrated delay previously described, is not able to optimize braking characteristics in this respect. It is thus advantageous to make the delay dependent upon actual wheel speed rather than independent of wheel speed. It is thus one object of this invention to provide an adaptive braking system for a wheeled vehicle having means for delaying the automatic control of the vehicle braking system.

It is another object of this invention to provide such a delay means which operates in response to wheel rotational speed.

It is one more object of this invention to provide an adaptive braking system for use on wheeled vehicles which will cause a braked vehicle to come to a controlled stop by modulating the braking force to maintain a wheel slip which will maximize within practical limits the force which is developed between the tire and road surface under conditions that are encountered.

One more object of this invention is to provide in an adaptive braking system of the type described a delay means for inhibiting automatic braking control of the vehicle until certain dynamic wheel states have been obtained in order to prevent false triggering of the adaptive braking system and additionally to insure optimized braking characteristics of the vehicle at all times.

Briefly, this new delay means operates as follows. An electrical counter mounted on or in close proximity to a wheel to be controlled senses the rotational velocity of that wheel so as to provide the basic input in the form of an electrical frequency proportional to wheel velocity to a control channel associated with that wheel which generates a pulse train having a repetition rate related to the input frequency. A counter converts the pulses into a DC voltage proportional to wheel velocity. This velocity signal is differentiated to obtain an acceleration signal which is compared with a predetermined reference voltage corresponding to a given deceleration ($-g_1$). If and at the time the reference deceleration voltage is exceeded, a memory memorizes the then attained velocity of the controlled wheel. If thereafter during a fixed time period the wheel speed decreases by a predetermined percent of its value at the time of memorization, means are activated to initiate automatic and optimized braking control of the vehicle.

The delay means is shown as used in an adaptive braking system control channel having a novel vacuum actuated hydraulic brake fluid pressure modulator which allows brake pressure to be rapidly decreased, slowly or rapidly increased depending on the dynamic state of the controlling wheel so as to fully optimize the vehicle braking characteristics. The braking cycle of this particular system including the delay means produces a condition such that the wheel slip will tend to hang on the front side and just below the peak of the mu-slip curve during the slow brake pressure build up. Memorization of the wheel speed at the $-g_1$ point, coupled with the requirement for a wheel speed decrease over a fixed period of time before brake pressure is reduced ensures that pressure reduction takes place at a point beyond the peak of the mu-slip curve and, additionally, serves to prevent deceleration peaks caused by road shocks from triggering the antiskid system. The rapid pressure drop triggered when the wheel attains the $+_2$ acceleration level prevents locking of the wheel, while the acceleration of the wheel towards car speed decreases wheel slip so that the wheel slip point being traced on the mu-slip curve passes back over the peak of the curve before the brake pressure will once again slowly increase.

It is still another object of this invention to provide logic circuitry which can distinguish between a locked wheel and a stopped vehicle condition and will automatically take appropriate action in accordance with this information.

DESCRIPTION OF THE PREFERRED EMBODIMENT

Figure 1:
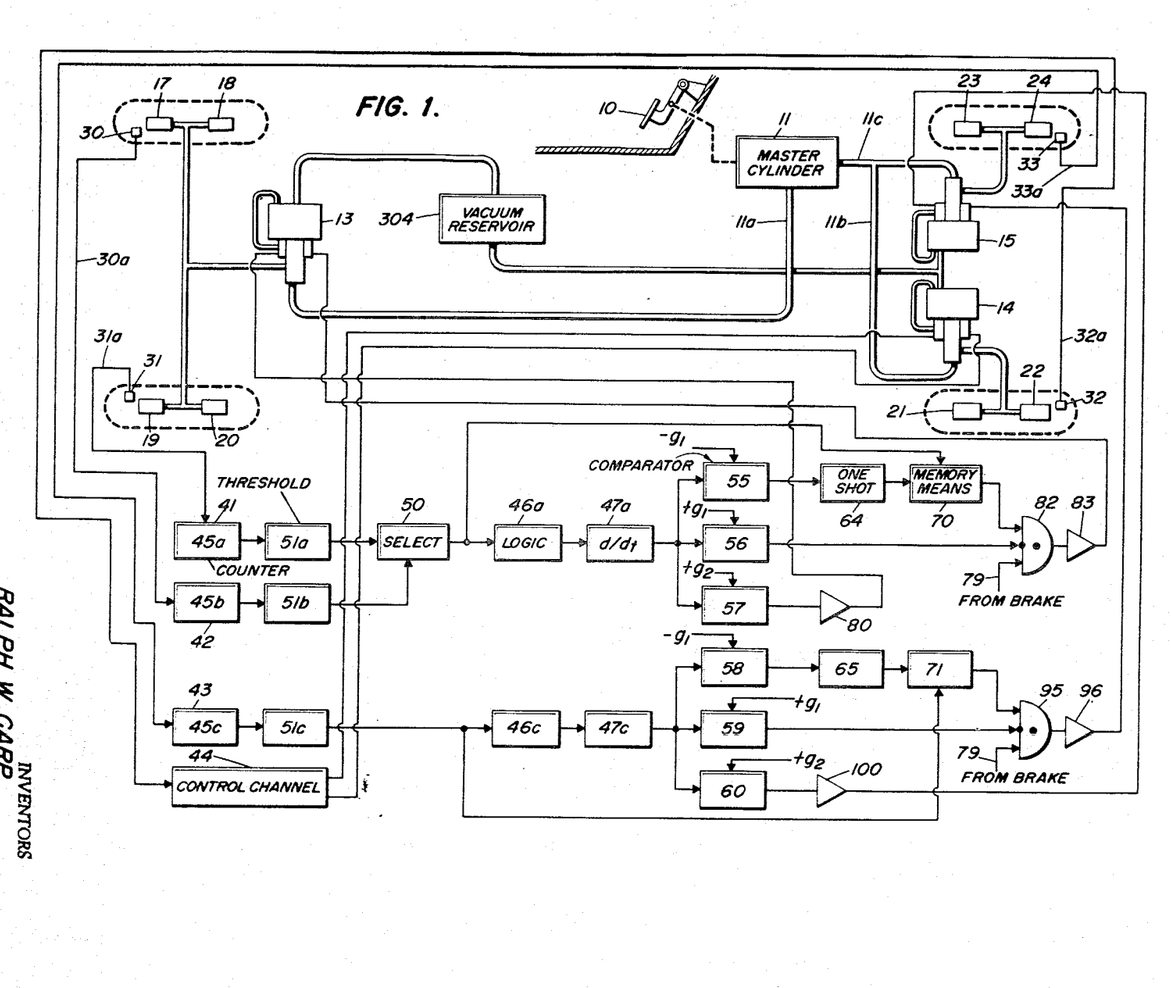
FIG. 1 is a functional block diagram of an antiskid system installed in a passenger motor vehicle having sensors on each wheel and pressure modulators controlling each front wheel individually and the rear axle.

In the description of FIG. 1 it should by understood that control channel 44 is identical to control channel 43 and the description of the structure and operation of channel 43 is applicable to the structure and operation of channel 44, the only exception being that channel 43 controls the left front wheel of the vehicle shown while channel 44 controls the right front wheel.

Referring to FIG. 1, a brake pedal 10 may be depressed to pressurize the hydraulic fluid in master cylinder 11 which thereby supplies a fluid pressure in hydraulic lines 11a, 11b and 11c in the conventional manner. Each hydraulic line has interposed in its path a vacuum actuated pressure modulator 13, 14 or 15 which, when the antiskid device is inoperative, allows hydraulic pressure to pass therethrough unimpeded, as will be later explained, to wheel brake cylinders 17 to 24. Wheel speed sensors 30 to 33, one mounted on and sensing the rotational velocity of each wheel, generate pluses linearly related to wheel velocity, which pulses are applied over electrical lines 30a, 31a, 32a and 33a to control channels 42, 41, 44 and 43, respectively. The pulses are converted to a DC voltage level in counters 45a, 45b and 45c. This DC voltage level which is proportional to wheel velocity can pass through threshold 51a, 51b or 51c only if the velocity of the sensed wheel is above a set threshold. In the case of channel 43 (and hence channel 44) the velocity signal is analyzed by logic circuitry 46c to recognize the locked wheel or the stopped vehicle condition in a manner to be described later. This logic function is performed in channels 41 and 42 by logic circuitry 46a after a velocity signal has been selected by select circuitry 50 which, it will be shown, can be designed to select either the higher or lower velocity signal.

It should be understood that the selection of a wheel having a higher velocity, while providing the shortest stopping distance, could result in some lateral stopping instability if the wheel having the lower velocity locks while the controlling wheel continues to turn due to higher mu forces on the controlling wheel. If the wheel having the lower velocity is selected to control there will be some sacrifice in stopping distance but with improved lateral stability. The optimum adaptive braking system, it should now be obvious, is a system in which each wheel is controlled by an independent control channel, however, weight, space and economic considerations may require a compromise so that various types of select circuitry will be shown to illustrate the versatility of the invention in this respect.

Any change in the DC level, indicating a change in wheel velocity, is processed by differentiators 47a and 47c to produce a signal correlative to wheel acceleration, which signal in channel 43 is compared with predetermined reference voltage levels in comparators 58 to 60 while the acceleration signal developed in the hybrid channel 41 and 42 is applied to comparators 55, 56 and 57. It can thus be seen that channels 41 and 42 are combined by gate 50 into a single channel which further processes only the selected velocity signal. Channels 43 and 44, however, are independent from one another and are independent from the combined channels 41 and 42. Additionally, except for the combining of channels 41 and 42 by gate 50, the channels are essentially identical to one another, thus the following discussion, for simplicity, will be restricted to a description of channel 43 with the understanding that the description applies equally to the other channels of the system.

As in the case of channels 41 and 42, the output of differentiator 47c is a voltage signal correlative to wheel acceleration (and deceleration) of the wheel controlled by channel 43. This acceleration signal is applied to comparators 58, 59 and 60. When the vehicle is braked, the wheels immediately start to slow down thereby producing an output from differentiator 46c corresponding to the wheel deceleration. Comparator 58 has applied thereto a reference voltage level corresponding to the predetermined value of wheel deceleration ($-g_1$). If wheel deceleration should exceed this reference level an error signal is generated by comparator 58 which triggers one shot 65, suitably a monostable multivibrator. The leading edge of the one shot output pulse enables memory means 71, which suitably includes a low loss capacitor, to memorize a voltage corresponding to a predetermined percentage of present wheel speed. If, at any time during the period of the one shot output pulse the wheel velocity signal decreases below the memorized voltage, memory means 71 generates a latching signal which is applied to latching gate 95. Gate 95 also receives an inhibit signal from comparator 59 when the acceleration exceeds a $+g_1$ acceleration reference level so that in the presence of a comparator 58 output, which indicates that wheel deceleration exceeds the $-g_1$ reference level, the lack of an output from comparator 59, which indicates that wheel acceleration has not exceeded the $+g_1$ reference level and a signal over line 79 which indicates that the brakes have been applied, gate 95 is latched open and a signal passes therethrough to amplifier 96 and vacuum modulator 15. The effect of this signal on modulator 15 will be explained later.

Vacuum actuated pressure modulators 13, 14 and 15 are identical except for the fact that modulator 13 controls the brake pressure supplied to both rear wheels, whereas modulators 14 and 15 control the brake pressure supplied to the right front and left front wheels respectively. Refer now to the pressure modulator shown in greater detail in FIG. 4. A rubber diaphragm 310 divides modulator body 301 into two chambers, 301a and 301b. Modulator chamber 301a communicates through check valve 302 and vacuum conduit 303 with a vacuum reservoir 304. A solenoid valve 314 having a winding connected to receive the output of gate 95 via amplifier 96 (FIG. 1) operates when energized in response thereto to admit atmospheric air into modulator chamber 301b. Rubber diaphragm 310 is generally airtight except for orifice 311 which allows restricted pneumatic communication between chambers 301a and 310b. Thus, with valve 314 deenergized, no atmospheric air can enter the modulator so that the vacuum on each side of diaphragm 310 is balanced and spring 316 biases diaphragm 310 to the right. When the solenoid valve opens in response to a gate 95 output, air is admitted into chamber 301b and thence through orifice 311 into chamber 301a and finally into vacuum reservoir 304. However, orifice 311 is very much smaller than the effective air passage through solenoid valve 314 so that air pressure builds up in chamber 301b thus forcing diaphragm 310 to the left against its biasing spring. A displacement rod 312 is connected at one end to the diaphragm and terminates at its opposite end in axially located pin 320 which, extending through valve seat 321, abuts valve ball 322. When diaphragm 310 is all the way to the right, corresponding to gate 95 being closed, valve ball 322 is lifted from valve seat 321 allowing free communication of hydraulic brake fluid from the master cylinder through valve ports 330 and 331 to the wheel cylinders. As the diaphragm moves slightly to the left carrying with it displacement rod 312, as would occur when gate 95 (FIG. 1) opens initially, abutting pin 320 also moves to the left, allowing spring 323 to force ball 322 against seat 321, thereby isolating the master cylinder from the wheel cylinders and trapping a pressurized fluid in the wheel cylinder. At the instant the wheel cylinders become isolated the brake fluid pressure therein will be equal to the brake fluid pressure developed in the master cylinder which, in the case of a panic stop, could be well above that pressure required to lock the wheels. Since, however, some finite time is required for the wheels to lock, at this instant the wheels have not yet attained the locked condition and additionally, diaphragm 310 continues to move to the left. This diaphragm movement carries displacement rod 312 and Vee packing gasket 340 also to the left. Expansible valve interior 341, whose left edge is defined by gasket 340, increases in volume causing the hydraulic fluid pressure trapped in the wheel cylinders to be thus attenuated. At maximum displacement of the diaphragm the volume of chamber 341 has increased to the point where the fluid pressure in the wheel cylinders has been substantially relieved and the braking on that wheel correspondingly released. This wheel is now accelerating.

Figure 4:
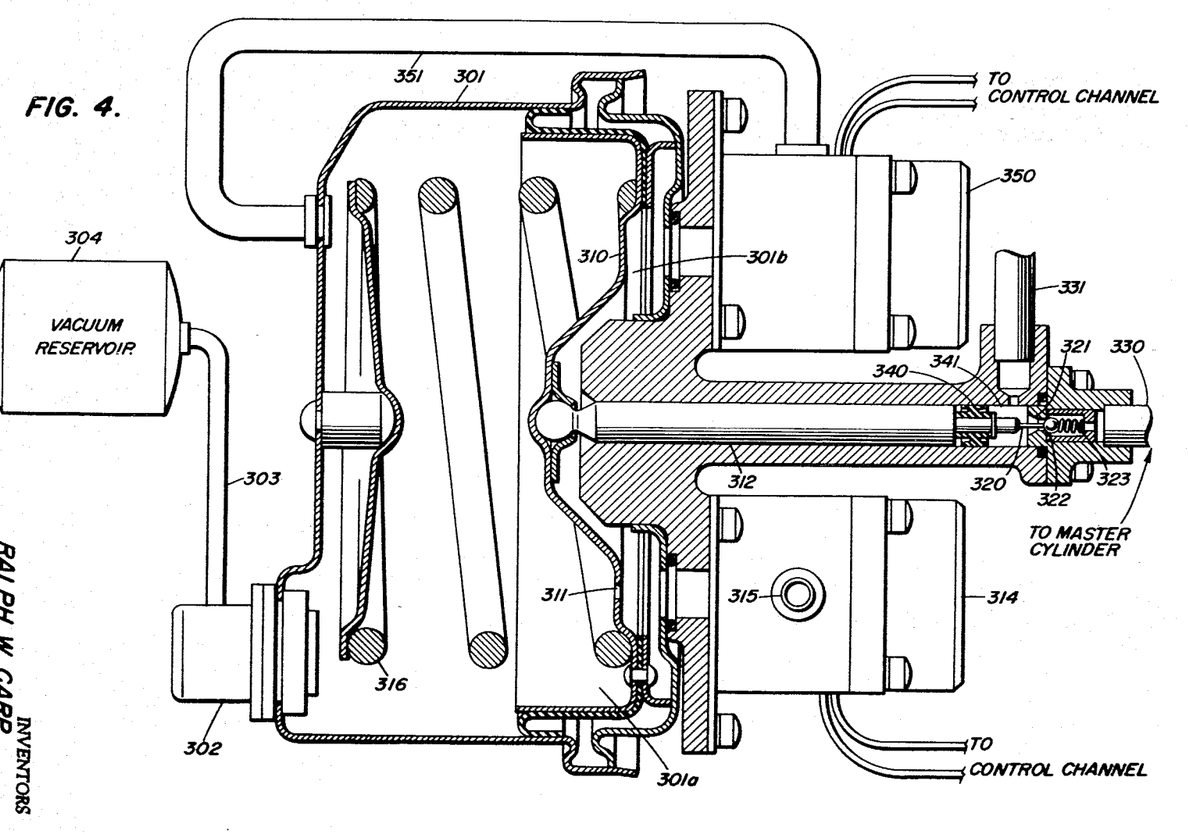
FIG. 4 is a cutaway view of a pressure modulator made in accordance with the teachings of this invention.

Referring also to FIG. 1, as the wheel is now accelerating the output of differentiator 46c changes from a deceleration to an acceleration signal so that comparator 58 no longer produces an output. It will, however, be remembered that gate 95 is latched open until the differentiator 47c output exceeds the $+g_1$ reference level, which event causes comparator 59 to generate a gate 95 inhibiting signal. Gate 95 will thus become unlatched and will close, deenergizing solenoid valve 314 thereby isolating the interior of the modulator body from the atmosphere. The atmospheric are entrapped in chamber 301b continues to leak through orifice 311. However, since solenoid 314 is closed, the air in chamber 301b is not being replenished so that the diaphragm will now move slowly back towards the right carrying with it displacement rod 312. The rate at which the diaphragm moves towards the right is determined by the leakage rate between chambers 301b and 301a. This is set by the size of the orifice which is quite small. The hydraulic fluid had previously been displaced from the wheel cylinders into chamber 314 is slowly forced back into the wheel cylinders, thus slowly increasing the brake pressure on the wheel. It will be noted that the acceleration signal generated by differentiator 47c is also applied to comparator 60, wherein it is compared to another acceleration level $+g_2$ which is higher than the reference acceleration level $+g_1$. If, in spite of the increasing brake pressure on the wheel, the wheel should continue to accelerate so that reference acceleration level $+g_2$ is exceeded, comparator 60 will generate an error signal which is amplified by amplifier 100 and applied to a solenoid bypass valve 350 which, although normally closed, in response to this amplified error signal opens so as to shunt orifice 311. The air entrapped in chamber 301b can thus move more rapidly into chamber 301a, allowing diaphragm 310 and displacement rod 312 to move more rapidly to the right thus causing the brake pressure at the wheel cylinder to increase more rapidly. As the wheel cylinder brake pressure increases, the wheel accelerates more slowly so that at first the $+g_2$ reference level is no longer exceeded. The error signal generated by comparator 60 is thus extinguished so that the bypass valve closes and diaphragm 310 resumes its slow movement to the right at the slow rate determined by orifice 311 so that brake pressure buildup returns to the slow mode. As wheel acceleration decreases still further the $+g_1$ acceleration level is no longer exceeded so that the comparator 59 error signal is also extinguished thus extinguishing the inhibit signal on gate 95. This does not effect the slow buildup of brake pressure but only allows gate 95 to be ready to receive the latching signal if the wheel decelerates below the $-g_1$ reference level and the cycle is repeated.

Figure 2:
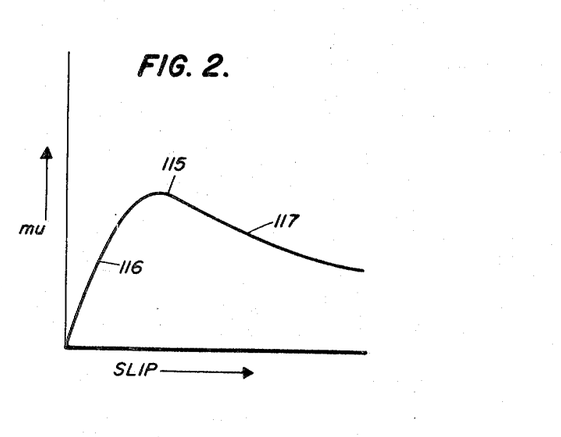
FIG. 2 is a typical mu-slip curve.
Figure 3:
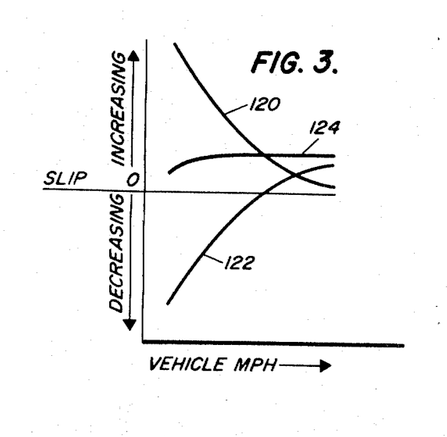
FIG. 3 is a plot of minimum slip values versus vehicle speed at memorization time.

Referring now to FIG. 2, a typical mu-slip curve is seen. Mu is the frictional force developed at the tire-road interface and at automotive speeds is the major force tending to slow the vehicle. In order to optimize the braking characteristics of a vehicle equipped with an adaptive braking system, it is necessary that the mu developed at each wheel be maximized, that is, that the frictional force developed between the tire and the road surface be a maximum. Slip is the difference between vehicle velocity and wheel velocity where the wheel velocity is equal to its angular velocity times its radius. Slip is expressed mathematically as $1-rw/V$, where $b=$ radius of the wheel; $w=$ rotational velocity of the wheel; and $v=$ vehicle speed. It has been found empirically that the maximum point 115 on a typical mu-slip curve for all investigated conditions of tire and road interface occurs between 0.15 and 0.30 slip. It has also been discovered through experimentation that under maximum mu conditions the highest stopping rate for a braked automobile that could be obtained was in the neighborhood of $-1g$. To insure that the antiskid system will operate about the peak of the mu-slip curve the aforementioned $-g_1$ reference level has been set at a voltage corresponding to 1.8g's deceleration. Since, at the time of wheel speed memorization the wheel must have obtained a 1.8g deceleration level while, as aforementioned, the maximum vehicle deceleration level is in the neighborhood of 1g, at the time of memorization there must be some wheel slip existing. Curve 120 of FIG. 3 shows the minimum value of slip with respect to the vehicle speed at the memorization time resulting from this difference in g level. It will be remembered that when the wheel attains a $-g_1$ level the wheel speed is memorized for a predetermined time during which the wheel speed is continuously monitored to determine whether it has dropped by a predetermined percentage. In an antiskid system designed for a standard passenger vehicle in which the $-g_1$ reference level is set at 1.8g a decrease in car speed of 15 percent during a memorization period of 108 milliseconds has produced an antiskid system having excellent braking capabilities.

Referring again to FIG. 3, curve 122 is a plot of minimum possible wheel slip versus vehicle speed if at the end of the 180 millisecond memorization period the wheel speed had decreased by exactly 15 percent. The minimum possible wheel slip at the time brake pressure is reduced will thus be a combination of the slips shown in curves 120 and 122, which is shown as curve 124. This curve shows that the minimum possible slip under the conditions stated is practically constant at all vehicle speeds and equal to approximately 0.15 slip.

Figure 5:
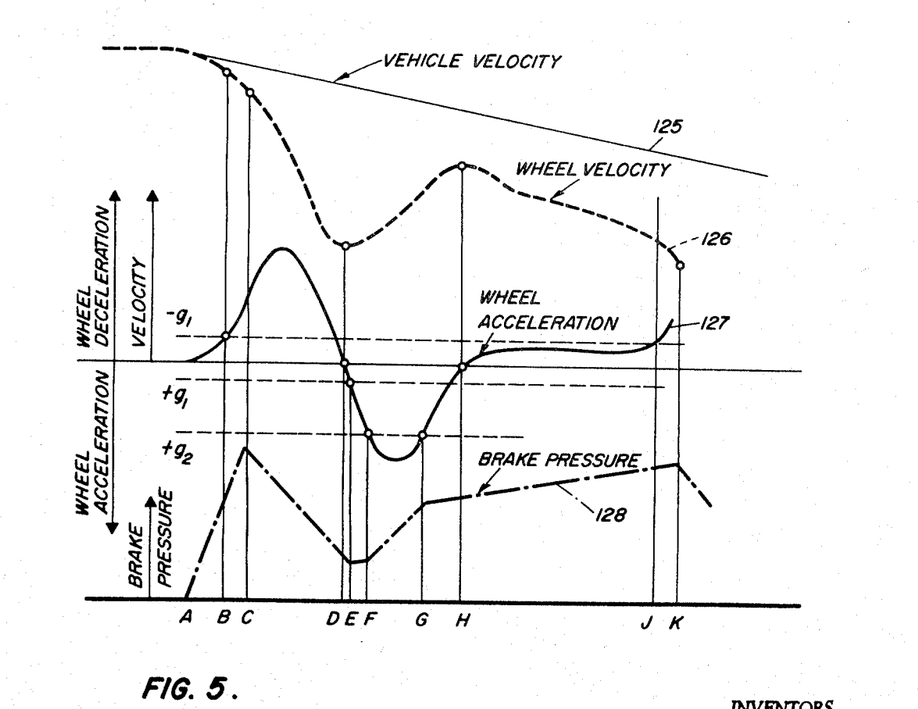
FIG. 5 is a plot of various vehicle parameters versus time during a braked stop controlled by an antiskid system of this invention.

Referring now also to FIG. 5, where curve 125 is a plot of vehicle speed versus time, curve 126 is a plot of wheel speed versus time, curve 127 is a plot of wheel acceleration versus time and curve 128 is a plot of brake pressure versus time. At a time prior to A the vehicle is unbraked so that the vehicle and wheel speeds are in synchronization. At time A the vehicle is braked so that the brake pressure rises rapidly and the wheel decelerates producing decreasing vehicle and wheel speeds. At time B the wheel decelerates past the $-g_1$ level and the wheel speed is memorized. At time C, which is less than 180 milliseconds after time B, wheel speed has decreased to 85 percent of the memorized speed so that brake pressure is now reduced. Due to inherent time lags in the hydraulic braking system the wheel will continue to decelerate for some finite time, attaining a maximum deceleration somewhere between time C and time D, the latter time being at the point of zero wheel acceleration. During this time, of course, the wheel would continue to slow down at a higher rate than the vehicle slowdown rate so that wheel slip continues to increase. It can now be assured that the wheel has passed over the hump 115 of the mu-slip curve shown on FIG. 2 and is operating along the portion of the curve 117. Wheel speed, of course, hits a minimum point at time D and thereafter as the wheel now is accelerating wheel speed is increasing toward vehicle speed. At time E wheel acceleration becomes equal to the $+g_1$ acceleration level so that once again brake pressure is slowly increased. This slow increase in brake pressure plus the aforementioned inherent lag in the hydraulic braking system allows wheel acceleration to continue to increase until at time F the wheel has accelerated to the $+g_2$ acceleration level. It will be remembered that at this time the pressure modulator bypass valve opens thereby allowing the brake pressure to increase rapidly as can be seen on curve 128 between time F and time G. During this time wheel acceleration has continued to increase past the $+g_2$ acceleration level, finally reversing and returning below the $+g_2$ acceleration level at time G, thus closing the bypass valve so that once again brake pressure is increased at a slow rate due solely to the orifice in the vacuum modulator diaphragm. At time H the wheel once more passes through the zero acceleration level and again begins to decelerate. During the time that the wheel has been accelerating, that is time D to time H, the slip as shown in FIG. 2 has been moving from the 117 portion of the mu-slip curve back over the hump 115 and into the 116 portion of the curve. At time H the slip is in close proximity to hump 115 but on the portion of the curve 116. Since the wheel is now in the $-g$ region slip again will increase slowly under the influence of the slowly increasing brake pressure and once again approach hump 115. At a time just prior to J wheel slip reaches hump 115 on the mu-slip curve. A further increase in brake pressure unbalances the braking torque on the wheel for the existing road-tire interface conditions and the wheel proceeds rapidly toward lockup as can be seen in the sharp rise in wheel deceleration at that time. At time J wheel deceleration exceeds the $-g_1$ level so that the cycle is once again repeated.

Figure 6A:
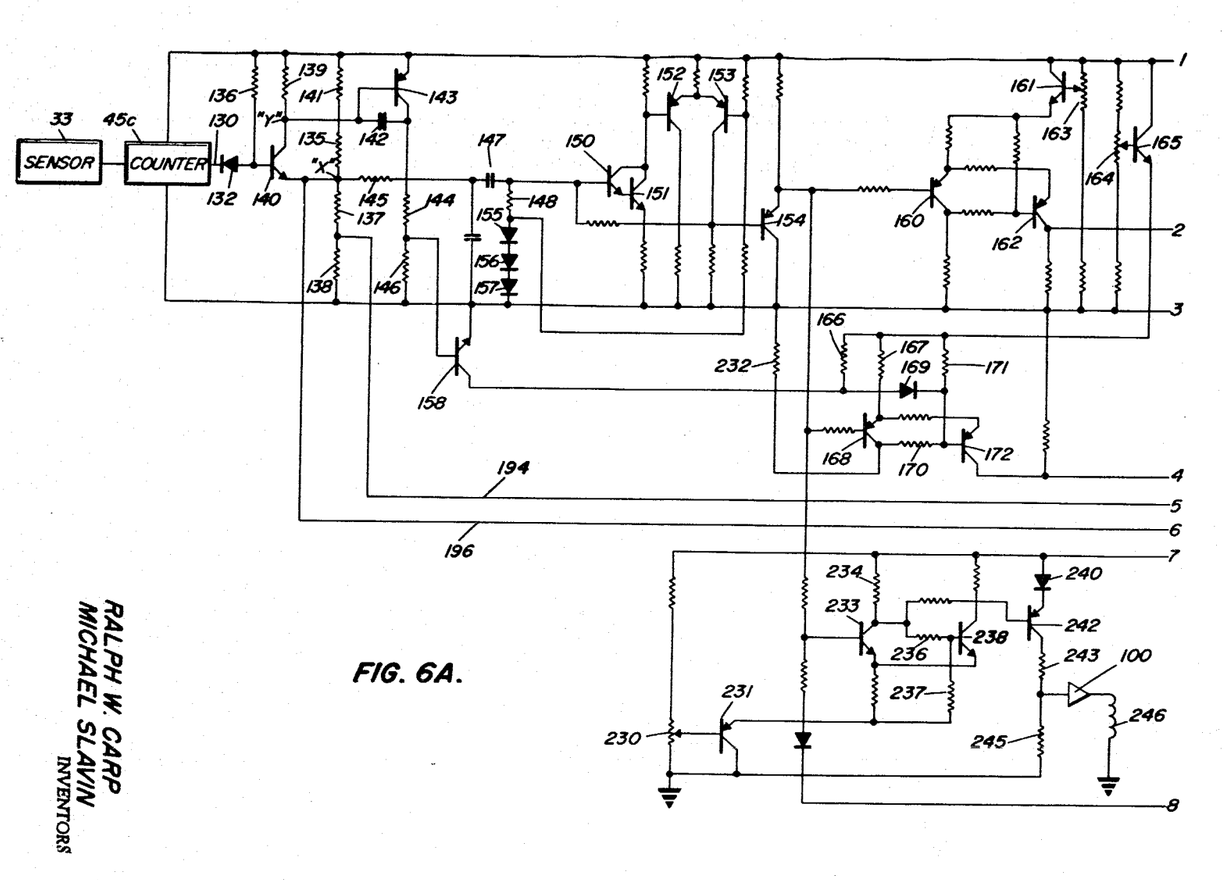
FIGS. 6A and 6B comprise a schematic of a single antiskid control channel.
Figure 6B:
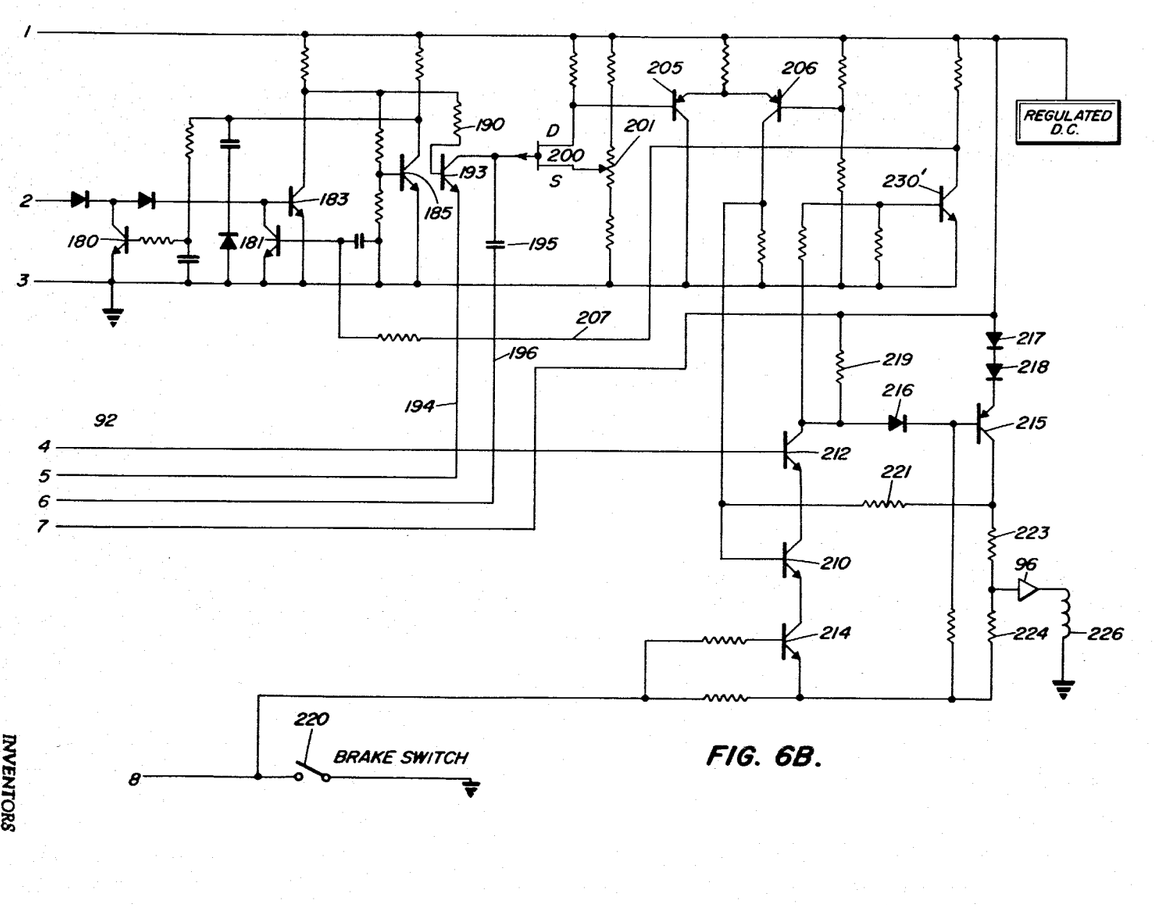

Refer now to FIGS. 6A and 6B which together comprise a typical channel for controlling a single wheel such as, in this embodiment, the left front wheel. In these figures, line terminations 1 to 8 of FIG. 6A are connected to line terminations 1 to 8 respectively of FIG. 6B. Sensor 33, which is driven by the left front wheel, for example, is suitably a variably reluctance alternating current type generator providing a signal having a frequency varying directly as the rotor speed and consequently as wheel speed, which signal frequency is impressed on counter 45c. The counter includes a limiter transistor which is normally biased into saturation, but which is biased nonconductive by negative half-cycles generated by the sensor. The limiter transistor output, therefore, will consist of pulses at approximately the regulated source voltage and will be of fixed amplitude with a frequency proportional to wheel speed. The counter also includes a counter circuit of the energy storage type to which these speed pulses are applied so that a voltage proportional to actual wheel speed appears as the counter output on terminal 130.

Due to the back-to-back connection of diode 132 and the base-emitter diode of emitter-follower 140, the speed voltage on terminal 130 is reproduced on the emitter of emitter follower 140 with the exception that the emitter voltage cannot fall below a bias voltage supplied by the voltage divider comprised of resistors 135, 137, 138 and 141. The use of this bias voltage to eliminate velocity signals below a set threshold will be explained later.

The emitter-follower emitter voltage, which, when above the threshold (bias) value, is a DC voltage proportional to wheel speed, is applied through the differentiator comprised to resistor 145 and capacitor 147 to the base of transistor 150, which is part of a linear derivative amplifier comprising transistors 150, 151, 152, 153 and 154, whose gain is predetermined in the conventional manner to be a given voltage level per $g$ of wheel acceleration. Temperature compensation is provided by diodes 155, 156 and 157. The amplified acceleration signal which appears on the emitter of transistor 154 is coupled to the base of transistor 160 which, together with transistor 162, comprise a comparator 160 which, together with transistor 162, comprise a comparator in the form of a Schmitt trigger, the triggering point of which is set by the bias supplied to transistor 161 by the setting of potentiometer 163 which thus determines the bias condition of transistor 162. This triggering point is set at a voltage corresponding to the $-g_1$ reference level. In like manner the acceleration signal is also applied to the Schmitt trigger comprised of transistors 168 and 172, the biasing of transistor 165 as supplied by potentiometer 164 determining the triggering point which is set to a voltage corresponding to the $+g_1$ reference level. Also in like manner the acceleration signal is applied to the Schmitt trigger comprised of transistors 233 and 238 which triggers in accordance with the setting of potentiometer 230, which controls the bias on transistor 231, this last-mentioned triggering point being the $+g_2$ acceleration level. When the $-g_1$ deceleration level is exceeded the Schmitt trigger output appearing on the collector of transistor 162 triggers the one-shot comprised of transistors 181, 182 and 185, the output of which is applied through resistor 190 to the base of transistor 193 so as to turn that transistor off. The one-shot output pulse also forward biases transistor 180, thus effectively preventing subsequent acceleration signals from reaching the one-shot. Transistor 193 is normally conductive so that there is normally impressed across capacitor 195 a voltage proportional to 85 percent of the instantaneous wheel speed. This last-mentioned voltage is obtained via line 196 which applies to one side of capacitor 195 the voltage appearing on the emitter of the emitter-follower 140 thus being the voltage proportional to wheel velocity, while the other side of capacitor 195 receives by a line 194 the emitter voltage of emitter-follower 140 as divided down by the voltage divider comprised of resistors 137 and 138 this latter voltage being proportional to 15 percent of the instantaneous wheel speed. When transistor 193 becomes nonconductive the voltage remaining across capacitor 195 is thus proportional to 85 percent of the instantaneous wheel speed. If during the memorization period, which is the period of the one-shot during which time transistor 193 is nonconductive, wheel speed drops by 15 percent, since the voltage across capacitor 195 remains constant and the voltage on line 196 drops by 15 percent, the voltage on the gate of field effect transistor 200 passes through ground thus triggering it. Any output of the field effect transistor is amplified in the differential amplifier comprised of transistors 205 and 206 with this amplified output being applied to the base of transistor 210, which together with transistors 212 ad 214 comprise an AND gate. Transistor 212 is maintained in the conductive condition whenever the $+g_1$ acceleration level is not exceeded by the conductive state of the Schmitt trigger transistor 172. Transistor 214 is maintained conductive whenever the brake switch 220 is closed as would be the case when the brakes are applied by the vehicle operator. Normally, transistor 215 is shut off due to the back-bias applied by diode 216 in its base circuit and diodes 217 and 218 in its emitter circuit. However, when transistors 210, 212 and 214 are conductive as is now the case, so that current is drawn through resistor 219, the voltage on the anode and hence also the cathode of diode 216 drops so that transistor 215 becomes conductive thus applying the gate output signal through the voltage divider comprised of resistors 223 and 224 to power amplifier 96, the amplified output of which energizes solenoid winding 226 of solenoid valve 314 which is part of the vacuum actuated pressure modulator of FIG. 4. Voltage in the collector of transistor 215 is fed back through resistor 221 to the base of transistor 210, hence latching this transistor in the conductive state so that gate 95 will again open even though the wheel should accelerate below the $-g_1$ deceleration level as long as the brake pedal remains depressed and the $+g_1$ acceleration level is not exceeded. As soon as gate 95 opens transistor 212 collector voltage drops due to the aforementioned current flow through resistor 219. This voltage drop is coupled to the base of transistor 230' which, although normally conductive, is now turned off thus causing its collector voltage to rise. This increased voltage is conveyed by line 207 to the base of the one shot transistor 181 thus extinguishing the one shot output pulse.

Since solenoid valve 314 of FIG. 4 is now open the wheel will begin to accelerate toward vehicle speed in the manner previously described until the wheel has accelerated to the $+g_1$ reference level, at which time the Schmitt trigger comprised of transistors 168 and 172 is triggered. During the time that the wheel is accelerating above the $+g_1$ acceleration level transistor 172 is turned off thus removing the forward bias on gate transistor 212 so that the gate is disabled and unlatched.

While the wheel acceleration is below the $+g_2$ reference level transistor 242 is saturated by the emitter voltage supplied through diode 240 and the base voltage produced by resistors 234, 236 and 237, and the emitter-base diode of transistor 231. Power is thus supplied through the voltage divider comprised of resistors 243 and 245 to the power amplifier 100 which thus energizes winding 246 of the normally open bypass solenoid valve 350 shown in FIG. 4, thus powering this solenoid shut. Whenever the wheel acceleration exceeds the reference $+g_2$ acceleration level Schmitt trigger transistor 233 is turned off so that its collector voltage rises, thus back-biasing transistor 242 and interrupting the power to solenoid winding 246 so that by pass valve 350 opens.

At low speeds antiskid behavior may not be fully predictable and is not absolutely necessary for safe control of the vehicle. It would thus appear to be advantageous to provide a system which allows the braking system to operate normally when wheel speed is below a predetermined threshold value. However, the dropping of a wheel speed below threshold value may be due to one of two causes: either the vehicle itself and hence the wheel has dropped below the threshold speed; or, the wheel is operating on such a low friction coefficient surface that it has gone into lockup before the control channel could function properly. It is thus imperative that the control channel be able to distinguish between the locked skidding wheel and the stopped vehicle conditions. The state of the control channel at the time the wheel speed drops below threshold speed is used to distinguish between these conditions. When the wheel is above the threshold speed, emitter-follower 140 is conductive so that its collector voltage is depressed. Transistor 143 whose base is connected to the emitter-follower collector is conductive, thereby charging capacitor 142 and supplying forward bias to transistor 158 through the voltage divider comprised of resistors 144 and 146. The current flow through transistor 158 and resistor 166 lowers the voltage on the anode of diode 169, thus back-biasing this diode. Schmitt trigger transistor 172 is biased in the conductive state as aforementioned by the voltage divider comprised of resistors 170, 171 and 232 so that a latching signal is provided from the collector of this transistor to the base of gate transistor 212. When wheel speed drops below the threshold value the voltage on the collector of emitter-follower 140 is pulled toward source voltage, thus attempting to turn off transistor 143. However, the RC circuit comprised of capacitor 142 and resistors 139, 144 and 146 continues to hold transistor 158 in the conductive state for the time necessary to discharge the capacitor. In a practical, working system this time during which the control channel continues to operate after wheel speed has dropped below threshold speed has been set by the choice of resistor 139 and capacitor 142 to 0.4 seconds.

It now remains to be shown that the state of the control channel at the time wheel speed drops below threshold speed is determinative of whether the wheel is skidding or not. Of course, if the wheel speed always remains below threshold speed, the speed voltage on the emitter of emitter-follower 140 remains constant so that a zero acceleration signal is generated and the control channel remains inactive. If, however, at the time the wheel speed drops below threshold value wheel deceleration had exceeded the $-g_1$ reference level and wheel velocity had dropped by 15 percent during the memorization period so that brake pressure is being released, the brake pressure will continue to be released during the 0.4 second delay period. If wheel skid is imminent, vehicle speed will be greatly in excess of wheel speed so that the wheel, in response to decreasing brake pressure, will increase in speed above the threshold speed during the delay period and the control channel will reacquire control. If wheel skid is not imminent, vehicle speed will be close to wheel speed and the wheel will not accelerate over the threshold speed during the delay period. In the later case, at the end of the delay period, transistors 143 and 158 turn off and diode 169 becomes forward biased thus turning off transistor 172 and causing transistor 212 to become unlatched so that solenoid winding 226 is unenergized and braking control is returned to the vehicle operator. In a practical operating system, a threshold speed of 5 miles per hour has been selected.

Figure 7:
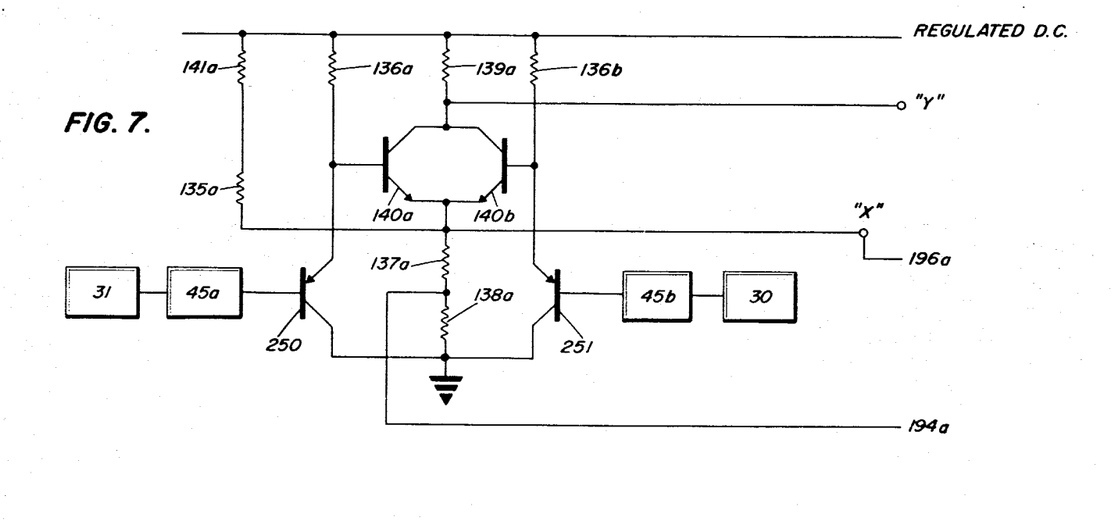
FIG. 7 is a schematic of a circuit for combining control channels to control a group of wheels in accordance with information received from the fastest wheel.

Referring now to FIG. 7 a sensor 31, such as would be connected to and sensing the velocity of the right rear wheel, drives counter 45a so as to generate a DC voltage correlative to wheel velocity which is applied to the base of transistor 250. Sensor 30, such as would be connected to and sensing the rotational velocity of the left rear wheel feeds counter 45b which thus generates a DC voltage correlative to the velocity of the left rear wheel, which voltage is applied to the base of transistor 251. The base-emitter diodes of transistors 250 and 251 perform the same function as diode 132 shown in FIG. 6A. The outputs of transistors 250 and 251 are applied respectively to the bases of differentially connected transistors 140a and 140b which are connected as emitter-followers. Only one of the differentially connected emitter-followers may be conductive at one time, the conductive emitter-follower being that emitter-follower to which the larger signal is applied. Hence, that rear wheel having the higher velocity will control the output of the select circuitry which appears at the collectors of the emitter-followers (terminal "Y") and the output which appears at the common emitters of the emitter-followers (terminal "X"). Those circuit elements having letter suffixed numeral designations correspond to similarly enumerated circuit elements in FIG. 6A, while terminals "X" and "Y" in FIG. 7 correspond to terminals "X" and "Y" in FIG. 6A. This method of circuit designation, which is also employed in FIG. 8, yet to be described, should clarify the position of the select circuit in the control channel circuitry.

Figure 8:
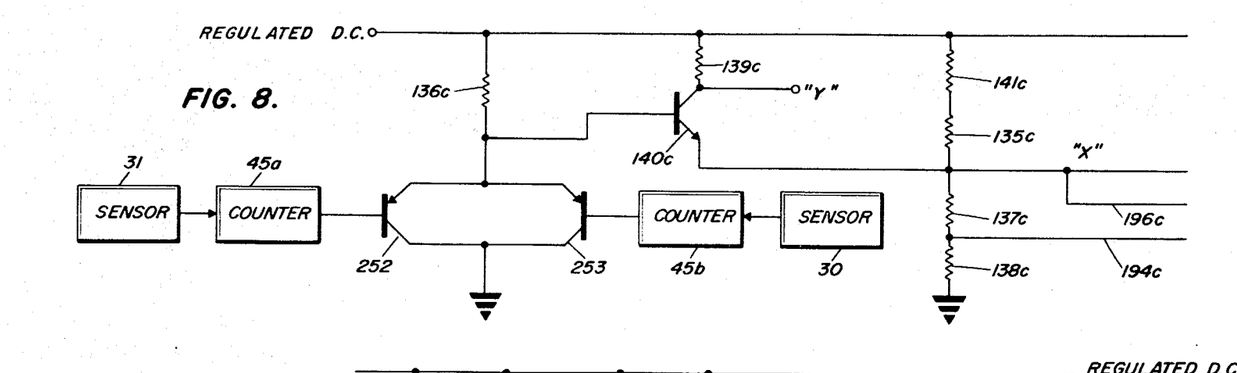
FIG. 8 is a schematic of a circuit for combining controls channels to control a group of wheels in accordance with information received from the slowest wheel.

Refer now to FIG. 8. As before, the output of counter 45a, which is a DC voltage proportional to the velocity of the right rear wheel, is applied to the base of transistor 252 while the output of counter 45b, which is a DC voltage proportional to the velocity of the left rear wheel, is applied to the base of transistor 253 which is differentially connected with transistor 252 so that the transistor having the higher base voltage, corresponding to higher velocity, is turned off and the lower voltage corresponding to the velocity of the slower wheel controls the circuit. The base emitter diode of transistor 252 or 253, whichever is conductive, and the base emitter diode of transistor 140c perform the same thresholding function as diode 132 and transistor 140 respectively of FIG. 6A.

From the aforementioned discussion it should be obvious that a vehicle could be equipped with an independent control channel such as channel 43 or 44 for each wheel for any number of wheels. It should also be obvious that it is also possible to control a group of wheels by the use of select circuitry such as shown in FIGS. 7 or 8. Other alterations and modifications will become apparent to one skilled in the art, therefore we do not wish to limit our invention to the specific form shown and accordingly hereby claim as our invention the subject matter including modifications and alterations thereof encompassed by the true spirit and scope of the appended claims.

The invention claimed is:

1. In an antiskid system for wheeled vehicles having at least one control channel for controlling braking of at least one wheel in response to dynamic conditions of at least one wheel and including first means for reducing braking force on a vehicle wheel in response to said dynamic conditions achieving a predetermined threshold, means for delaying the response of said first means comprising:
   means for generating a first signal proportional to wheel velocity;
   means responsive to said dynamic conditions achieving said predetermined threshold for generating a memorization signal;
   means responsive to said memorization signal for memorizing a predetermined percentage portion of said first signal; and,
   means comparing said memorized portion with said first signal for allowing said first means to respond to said dynamic conditions.

2. An antiskid system as recited in claim 1 wherein said memorization signal generating means comprises a one-shot.

3. An antiskid system as recited in claim 1 wherein said means for generating a first signal comprises electrical means for generating a first electrical signal proportional to wheel velocity, said first electrical signal being referred to a first voltage level and said memorizing means and said comparing means include:
   charge storage means having first and second ports, said first port being connected to receive said first electrical signal;
   means for attenuating said first electrical signal;
   normally conductive means for applying said attenuated first electrical signal to said second port when conductive and responsive to said memorization signal for becoming nonconductive;

means for monitoring voltage across said charge storage means; and, means responsive to said voltage for allowing said first means to respond to said dynamic conditions.

4. An antiskid system as recited in claim 3, wherein said charge storage means comprises a capacitor and said normally conductive means comprises a transistor normally biased conductive and having its collector-emitter circuit connected to apply said attenuated first electrical signal to said second port, said transistor being biased nonconductive by said memorization signal.

5. An antiskid system as recited in claim 3, wherein said means for monitoring such charge storage voltage comprises a field effect transistor having a gate electrode connected to said first port, and a drain-source circuit; and, means for biasing said field effect transistor so as to effect an electrical change in said drain-source circuit when said gate electrode passes through a first predetermined voltage level.

6. An antiskid system as recited in claim 5, wherein said attenuating means comprises a voltage divider.

7. An antiskid system as recited in claim 5, wherein said attenuating means comprises a fixed resistor voltage divider.

8. In an antiskid system for wheeled vehicles having at least one control channel for controlling braking of at least one wheel in response to dynamic conditions of at least one wheel, means for delaying control of said at least one wheel by said at least one control channel comprising:

means for generating a first signal proportional to wheel velocity;

means responsive to a dynamic condition of said at least one wheel for generating a memorization signal; and, means responsive to said memorization signal for memorizing the instantaneous value of said first signal and thereafter comparing said memorized signal with said first signal, and for generating a control signal upon said first signal attaining a value which is a predetermined percentage of said memorized signal; and, means responsive to said control signal for releasing braking force from a vehicle wheel whereby said vehicle braking is controlled.

9. An antiskid system for wheeled vehicles having a braking system for applying braking force to at least a vehicle wheel, said antiskid system comprising:

first means for generating a first signal when the rotational deceleration of a vehicle wheel exceeds a predetermined threshold;

second means for generating a second signal proportional to velocity of a vehicle wheel;

third means responsive to said first signal for reducing braking force on said vehicle wheel; and, means for delaying response of said third means to said first signal until the instantaneous value of said second signal has decreased by a predetermined percentage of said second signal at the time said first signal was generated.

10. An antiskid system as recited in claim 9 wherein said means for delaying comprises:

means responsive to said first signal for memorizing a predetermined percentage of said second signal;

means comparing the memorized signal with subsequently generated instantaneous values of said second signal for generating a control signal upon said subsequently generated second signal attaining the value of the memorized signal, said third means being responsive to said control signal for reducing braking force.

11. An antiskid system as recited in claim 9 wherein said means for delaying comprises means comparing the value of said second signal at the time said first signal is initially generated with said second signal subsequently generated for generating a control signal upon said second signal attaining a predetermined percentage of the second signal at the time said first signal was initially generated, said third means being responsive to said control signal for reducing braking force on said vehicle wheel.

12. An antiskid system as recited in claim 11 with additionally timing means for enabling said comparing means for only a predetermined time period after said first signal is generated.

13. An antiskid system as recited in claim 11 wherein said third means comprises:

means responsive to said first signal for reducing said braking force; and, gate means opened by said control signal for passing said first signal to said means for reducing braking force.